United States Patent
Reinicke et al.

[15] 3,692,766
[45] Sept. 19, 1972

[54] CALCIUM LACTULOSATE

[72] Inventors: Hans Reinicke, Schwarzwaldstrasse 56; Senta Leonhauser, Kallstader Strasse 11, both of, 6804 Ilvesheim Bei Mannheim; Rudolf Weidenhagen, Emsheimer Strasse 40, 6501 Ulversheim Uber Mainz, all of Germany

[22] Filed: Oct. 22, 1970

[21] Appl. No.: 83,161

Related U.S. Application Data

[62] Division of Ser. No. 773,671, Nov. 5, 1968, Pat. No. 3,562,012.

[30] Foreign Application Priority Data

Nov. 7, 1967 Germany..........P 16 43 834.9

[52] U.S. Cl...............................260/209 R, 260/999
[51] Int. Cl...............................................C07c 47/18
[58] Field of Search.......................................260/209

[56] References Cited

UNITED STATES PATENTS 3,505,309  4/1970  Carubelli...............260/209 R
3,546,206  12/1970  Guth et al...............260/209 R

*Primary Examiner*—Lewis Gotts
*Assistant Examiner*—Johnnie R. Brown
*Attorney*—Burgess, Dinklage & Sprung

[57] ABSTRACT

Calcium lactulosate prepared by introducing into a dilute aqueous solution of a crude lactulose syrup about 0.7 to 4 parts by weight of calcium oxide per part by weight of lactulose in the crude syrup at a temperature of about 0° to 15° C., allowing the resultant mixture to stand under conditions permitting maintenance of the temperature to about 0° to 15° C., and separating off the calcium lactulosate thereby formed.

1 Claim, No Drawings

CALCIUM LACTULOSATE

This case is a division of application, Ser. No. 773,671, filed Nov. 5, 1968 and now U.S. Pat. No. 3,562,012.

The invention relates to a process for recovering lactulose from crude syrups containing it, and more particularly relates to a process for preparing pure lactulose from crude lactulose syrup.

Lactulose is a disaccharide which has the structure of a 4-o-$\beta$-D-galactopyranosyl-D-fructose. Conventionally lactulose is prepared from lactose by epimerization with lime or with basic ion exchangers. The crude lactulose syrups thus obtained are mixtures of different sugars, and predominantly of lactulose, lactose and galactose.

Lactulose has recently taken on considerable medical interest, as it has been found to possess a bifidogenous action, that is, a Bifidus flora can be produced in the intestine following the administration of lactulose. This Bifidus flora prevents the formation of toxic substances in the intestine, which can, in turn, lead to "hepatic encephalopathy," this being particularly true in connection with pathological liver ailments. A laxative effect is also ascribed to lactulose. The use of lactulose in either of the above clinically indicated areas has hitherto been restricted by the fact that the production of pure lactulose from crude lactulose syrups has been extremely difficult.

According to one known process, lactose is first removed as far as is possible by crystallization and the remaining lactulose containing syrup oxidized anodically in the presence of sodium bromide or directly with bromine. The acids or salts which are formed as by-products in this reaction are then removed via ion exchangers and the relatively pure lactulose thereafter obtained from the eluate. Purification by this method involves numerous steps, and, because of these steps including the oxidation with bromine or the electrolytic oxidation, the ion exchange treatment and the fractional crystallization, it is expensive and very difficult to carry out on a large technical scale.

It is an object of this invention to provide a commercially feasible method for the preparation of satisfactorily pure lactulose.

It is a further object of this invention to provide a method which may be utilized in the commercial production of lactulose in highly purified form with a savings in time, labor and equipment costs.

Other objects and various further features of the present invention will become apparent from the following description.

In accordance with the invention it has now been discovered that lactulose can, under certain conditions, be separated from sugars accompanying the same in the form of a difficulty soluble calcium hydroxide compound. The discovery that a difficulty soluble calcium compound of lactulose could be prepared is to be considered very surprising, because the formation of such a compound has never been observed in the known lime epimerization process.

This product shall be referred to hereinafter as calcium lactulosate, although its chemical composition has not yet been precisely determined.

The process according to the invention for the preparation of pure lactulose from crude lactulose syrups comprises introducing into a dilute aqueous crude lactulose solution approximately 0.7 to 4 parts by weight of calcium oxide per part by weight of lactulose in the crude syrup at a temperature of 0°–15° and preferably 5°–10° C., allowing the resulting mixture to stand for a time while maintaining this temperature, separating the calcium lactulosate formed while maintaining the same temperature, washing the calcium lactulosate thoroughly with cold water, resuspending it in water at 0°–15° C., freeing the lactulose from its salt by separating the calcium by conventional methods and preferably by the precipitation of a difficulty soluble calcium salt, and recovering the pure lactulose by concentrating the solution thus obtained.

The freeing of the lactulose from the calcium lactulosate is carried out in a particularly simple and advantageous manner by introducing gases containing $CO_2$ and filtering out or centrifuging off the precipitated calcium carbonate.

Almost any crude syrup containing lactulose is suitable for use in the process of the invention. The lactulose syrups which are obtained by the epimerization of lactose can be used. These can also be obtained commercially. In carrying out the calcium precipitation of the lactulose it is important that not too much lactose and galactose be present in the starting solution. When the starting crude lactulose syrups have a high lactose content, it is advantageous to first separate the lactose insofar as is possible by crystallization, using the known methods for this purpose.

It has been found in accordance with the invention that the best yields of lactulose are obtained by the calcium hydroxide precipitation when the ratio of lactulose to lactose to galactose amounts to 1:0.2:0.17 in parts by weight. In other words, the yield and purity of product obtained by the calcium precipitation of lactulose is just as good when as many as 20 parts of lactose and as many as 17 parts of galactose are simultaneously present per 100 parts of lactulose as when starting from syrups containing essentially only lactulose. When the lactose and/or galactose content rises above the permissible level up to about twice the above indicated quantities, the yield of the desired calcium salt precipitated out gradually diminishes.

When the lactose concentration is higher than that stated above, the reduction in yield can be compensated by increasing the amount of calcium oxide used, the amount of calcium oxide having to be increased by approximately the same part by weight as the amount of lactose in the crude syrup differs from the permissible value. Alternatively the quantity of lactose present in the syrup may be reduced in weight by a removal of at least part of the lactose by crystallization.

When the quantity of galactose in the mixture is substantially above the permissible value, it must be reduced and preferably before the precipitation with the calcium oxide is effected.

Crude epimerization syrups usually contain about 70 percent solids, which in turn have a lactulose content of 50 to 60 percent. 100 parts of crude syrup therefore contain about 35 to 42 parts of lactulose. According to the process of the invention, 30 to 37 parts of lactulose can be recovered from such syrups having an $[\alpha]D^{20}$ of −42°, and from this about 28 to 34 parts of pure lactulose having an $[\alpha]D^{20}$ of −49°, can be recovered, if desired, by recrystallization from methanol.

It is advantageous to dilute the commercial crude syrup with water to produce a solids concentration (Brix) of 70–2, preferably 20–10 Brix, prior to the calcium hydroxide precipitation. In order to precipitate the calcium lactulosate, calcium oxide is added in a sufficient quantity to the dilute lactulose syrup. Preferably the calcium oxide is added in an amount approximately equal to the lactulose content in the crude syrup, although it is also possible to use smaller quantities of calcium oxide, i.e., amounts down to about 0.7 parts of calcium oxide per part of lactulose. It is advantageous to increase the amount of calcium oxide above the 1:1 weight ratio when the ratio of lactulose to lactose in the starting syrup differs from the optimum range as specified hereinbefore.

The calcium oxide is added preferably in the form of a homogeneous milk of lime.

When the milk of lime is added, care must be taken to maintain the temperature range of 0–15°, preferably 5–10° C. constant. The rate of addition of the milk of lime, the intensity of the stirring and the amount of cooling are dependent upon the requirement for maintaining the stated temperature.

After the addition of the milk of lime the suspension is allowed to stand for a short period of time in the above temperature range. The standing time should amount to about ½ an hour to 2 hours, depending on the temperature which is being maintained. Preferably the suspension is allowed to stand for about an hour at a temperature of 5°–10° C. In this period a certain aging of the calcium lactulosate takes place, which facilitates the separation which later takes place. Thereafter the precipitated calcium lactulosate is separated from the liquid phase by any conventional acceptable method and preferably it is separated by centrifuging or suction filtering. The separated calcium lactulosate is thoroughly washed with cold water, preferably ice water. Most preferably the washing is continued until the substance is substantially white.

The lactulose is then freed from the calcium lactulosate by separation of the calcium by conventional methods, preferably by dissociation of the salt with an acid that forms a difficulty soluble calcium salt with the calcium. Carbon dioxide is preferably used, because it is very cheap, forms an easily separable precipitate, and introduces no foreign materials into the solution. The precipitation of the calcium with oxalic acid, as the calcium oxalate formed is also easy to separate off is also a preferred method.

In the calcium separation process, the temperature is to be kept within the stated range for as long as the pH value is still relatively strongly alkaline.

As soon as the pH approaches neutrality, the cooling can be discontinued. If the dissociation of the calcium salt of the lactulose is carried out by the introduction of gases containing carbon dioxide, the introduction of gas is discontinued when the pH of the mixture amounts to between 7.5 and 6.7. Too low a pH must be avoided because of the danger of the formation of bicarbonate as a result of which calcium ions would be kept in solution.

The precipitated, difficulty soluble calcium salt is then separated in any desired manner and the filtrate is dried.

The concentration of the filtrate is preferably carried out in vacuo with heating. Excessively high temperatures are to be avoided thereby as a discoloration of the product will occur.

After the complete evaporation of the filtrate remaining following the removal of the calcium salt, the residue remaining is lactulose in a solid, very pure state, having a rotation $[\alpha]_D^{20}$ of about $-42°$. The yield amounts to about 30 to 35 parts per 100 parts of crude syrup having an initial content of 35 to 40 parts of lactulose. The recyrstallization of this lactulose from methanol increases the rotation $[\alpha]_D^{20}$ to about $-49.5°$. The yield of this pure crystallized product then amounts to about 28 to 30 parts.

It is advantageous to extract any galactose present from the filtrate obtained in the production of the calcium lactulosate.

The process of the invention is distinguished particularly by its extraordinary simplicity. It can be carried out without expensive apparatus, using no other reagents than calcium oxide, $CO_2$ and water. Due to its simplicity it is particularly well suited for the production of pure lactulose on a large technical scale, and in this it is very much superior to the purification processes known hitherto.

The following Example illustrates the present invention which is not to be considered as limited thereby.

EXAMPLE 100 parts by weight of crude lactulose syrup were diluted with 500 parts by weight of water and then cooled to about 5° to 10° C. 35 parts by weight of calcium oxide were slaked with 350 parts by weight of water so as to produce a uniform, grit-free milk of lime. Any coarse particles present were separated off by filtering. The milk of lime was then also cooled to from 5° to 10° C.

The milk of lime thereby obtained was then very rapidly poured into the dilute lactulose syrup under strong agitation and good cooling, the temperature not being allowed to rise above 15° C. This resulted in the formation of a mass which gradually became jelly-like, becoming increasingly thicker upon one hour of standing in the cold state. An easily filterable calcium lactulosate suspension formed, which was suction filtered through a refrigerated Buchner funnel. This doublewalled Buchner funnel was cooled down to about 2° C.

The filter cake was washed with a total of about 700 parts by weight of ice water in portions of 100 parts each. The washed filter cake was transferred to a vessel that had been previously chilled to the above-stated temperature range, and was therein suspended in water to a final volume of about 800 parts by weight, with stirring. During this time, care was taken to ensure that the temperature did not rise above 10° C.

Carbon dioxide was then introduced into the suspension until a pH value of about 7.0 had been reached, under continued refrigeration of the suspension. The calcium carbonate was allowed to settle out and was then separated off by filtering. The cooling was discontinued as soon as the pH value of 7 had been reached.

The filtrate which was thereby obtained was dried in a rotatory evaporator, the water bath temperature thereof being maintained at about 60° to 70°.

As it is advantageous to remove the last traces of water from the concentrate an azeotropic distillation with added methanol was carried out.

About 38 parts by weight of a feather-light lactulose were recovered the same being of sufficient purity as to be suitable for therapeutic use. In this form it was very readily soluble in methanol and was chromatographically pure; $[\alpha]D^{20} = -42°$. Enzymatic analysis of the lactulose showed a content of 95–98 percent lactulose (calculated on the basis of the anhydrous substance).

The product obtained could be still further purified by reprecipitation from absolute methanol, preferably with the addition of activated charcoal. The crystalline lactulose which thereby was precipitated had a rotation of $[\alpha]D^{20}$ of $-49.5°$. This latter crystalline substance was difficulty soluble in absolute methanol. If desired, therefore, another recrystallization can be carried out preferably using 90 to 95 percent methanol.

The separation of the calcium can also be carried out with ion exchangers.

What is claimed is:

1. Calcium lactulosate prepared by introducing into a dilute aqueous solution of a crude lactulose syrup about 0.7 to 4 parts by weight of calcium oxide per part by weight of lactulose in the crude syrup at a temperature of about 0° to 15° C., allowing the resultant mixture to stand under conditions permitting maintenance of the temperature to about 0° to 15° C., and separating off the calcium lactulosate thereby formed.

* * * * *